(12) United States Patent
Colangelo (10) Patent No.: US 9,253,266 B2
(45) Date of Patent: Feb. 2, 2016

(54) SOCIAL INTERACTION USING FACIAL RECOGNITION

(71) Applicant: Spayce, Inc., San Francisco, CA (US)

(72) Inventor: Patrick Colangelo, Cambridge, MA (US)

(73) Assignee: SPAYCE, INC., San Francisco, CA (US)

( * ) Notice: Subject to any disclaimer, the term of this patent is extended or adjusted under 35 U.S.C. 154(b) by 0 days.

(21) Appl. No.: 14/061,050

(22) Filed: Oct. 23, 2013

(65) Prior Publication Data

US 2014/0328521 A1    Nov. 6, 2014

Related U.S. Application Data

(63) Continuation-in-part of application No. 13/886,950, filed on May 3, 2013.

(51) Int. Cl.
*G06K 9/00* (2006.01)
*H04L 29/08* (2006.01)
*H04N 5/225* (2006.01)

(52) U.S. Cl.
CPC ............ *H04L 67/18* (2013.01); *G06K 9/00288* (2013.01)

(58) Field of Classification Search
CPC .................................. G06K 9/00; H04L 67/18
USPC .......................... 382/115–118, 103, 107, 236; 348/169–172, 352
See application file for complete search history.

(56) References Cited

U.S. PATENT DOCUMENTS

| | | | | |
|---|---|---|---|---|
| 8,077,915 | B2 * | 12/2011 | Thorn | G06Q 10/02 382/103 |
| 8,306,267 | B1 * | 11/2012 | Gossweiler, III | G06K 9/00241 382/103 |
| 8,861,804 | B1 * | 10/2014 | Johnson et al. | 382/118 |

* cited by examiner

*Primary Examiner* — Abolfazl Tabatabai
(74) *Attorney, Agent, or Firm* — Redbrick IP, P.C.

(57) ABSTRACT

A method for facilitating real-world interaction includes receiving information regarding geographical positions of a plurality of client devices, determining that a subset of the plurality of client devices are within a given distance of each other, matching a face detected in an image captured by one of the plurality of client devices to facial data stored in a user database, and providing, to the one of the plurality of client devices, information regarding a user associated with the facial data.

16 Claims, 5 Drawing Sheets

SOCIAL INTERACTION USING FACIAL RECOGNITION

CROSS-REFERENCE TO RELATED APPLICATIONS

This application is a continuation-in-part of, and claims priority to and the benefit of, U.S. patent application Ser. No. 13/886,950, filed on May 3, 2013, which is hereby incorporated herein by reference in its entirety.

TECHNICAL FIELD

Embodiments of the present invention relate generally to software applications that facilitate social interaction and, more specifically, to mobile-device applications for facilitating in-person, real-world communication.

BACKGROUND

Social media plays a larger and larger role in our lives; increasingly, members of our society interact with family, friends, co-workers, and acquaintances on-line via web browsers, mobile applications (from their smartphones, tablet computers, or similar devices), or other means. Many very successful web sites and services exist to facilitate this on-line interaction, including FACEBOOK, TWITTER, FOURSQUARE, VINE, and many others. Many of us use these services and value the virtual friendships that they allow.

These on-line services, however, at best do not help real-world interactions between people, and may in fact hider them. Increasingly, we retreat to our on-line personas and shrink away from real-world interaction. An older generation may, perhaps, have developed the social skills, confidence, and assuredness to (for example) walk into a room full of strangers and be at ease; they may have the social confidence to approach, speak to, or otherwise engage new people. Younger people, on the other hand, may have never known life without social media, and without its support, may struggle in traditional, in-person, real-world interactions with others.

Social media is here to stay. Efforts to withdraw from it, or eliminate it, are futile; those who wish for the end of social media as a means to cultivate traditional, in-person interaction will fail. A need therefore exists for a way to cultivate and facilitate real-world, in-person interaction that embraces and leverages existing paradigms of social media.

SUMMARY

In various embodiments, the present invention allows registered users of a software application or service to identify, recognize, or otherwise gather information regarding, other registered users within a given proximity based on received image data. In one embodiment, a user captures an image that includes one or more people; faces in the image are analyzed and compared to a database of known faces. If a match is found, that information (along with, in various embodiments, other information) is communicated to the user. The user may then use this information to facilitate an introduction or further conversation with the identified other user(s). The information may include simply that both users have registered with the software service, the other users' name, age, gender, address, or other such information, and/or the other users' hobbies, interests, activities, or other such preferences.

In one aspect, a method for facilitating real-world interaction includes receiving, at a server, information regarding geographical positions of a plurality of client devices; determining, at the server, that a subset of the plurality of client devices are within a given distance of each other; matching a face detected in an image captured by one of the plurality of client devices to facial data stored in a user database; and providing, to the one of the plurality of client devices, information regarding a user associated with the facial data.

The step of matching may be performed on the server or on the one of the plurality of client devices. The information may include a first name, last name, alias, hobby, interest, contact information, or business card associated with the user. A request for a payment, a payment, a chat request, text, a photo, or a request to initiate a game may be sent from the one of the plurality of client devices to the user. The facial data may be narrowed in accordance with a proximity of the user to the one of the plurality of client devices, a physical attribute of the user, a derived attribute of the user, or a social-media connection of the user. A plurality of faces may be detected in the image; information regarding a plurality of users associated with the plurality of faces may be presented to the one of the plurality of client devices in a random order, in an order sorted by distance to the one of the plurality of client devices, in an order sorted by sex or age of the users, or in an order that presents preferred users first. The image may be a still image or one of a plurality of video frames. An advertisement may be on the one of the plurality of client devices targeted based on information in the user database relating to the user.

In another aspect, a system for facilitating real-world interaction includes a database for storing a plurality of user profiles, wherein each user profile comprises facial data associated with a user and a processor for executing instructions including: receiving information regarding geographical positions of a plurality of client devices; determining that a subset of the plurality of client devices are within a given distance of each other; matching a face detected in an image captured by one of the plurality of client devices to facial data stored in the database; and providing, to the one of the plurality of client devices, information regarding a user associated with the facial data.

The client devices may include smartphones, tablet PCs, or laptop computers. The information regarding geographical positions of the client devices may be derived from a GPS receiver, Wi-Fi antenna, or user input on the client devices. The image may be captured using a still camera or video camera associated with the one of the plurality of client devices. The matching may be performed on a server or on the one of the plurality of client devices. The information may include a first name, last name, alias, hobby, interest, contact information, or business card associated with the user. A request for a payment, a payment, a chat request, text, a photo, or a request to initiate a game may be sent from the one of the plurality of client devices to the user. The facial data may be narrowed in accordance with a proximity of the user to the one of the plurality of client devices, a physical attribute of the user, a derived attribute of the user, or a social-media connection of the user.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Various embodiments of the invention described herein include a system and method for facilitating real-world interaction between a plurality of persons. In one embodiment, users create accounts on a server that include one or more images of the faces of the users. When a user is in a social setting involving one or more other people, the user captures an image or video that includes the faces (or other distinguishing characteristics) of the one or more people. The photo is analyzed and any faces detected therein are compared against user photos previously uploaded to the server. If one or more matches are found, the uploading user is informed thereof; the information may include merely confirmation of the match and/or the first and/or last name, alias, personal information, preferences or interests, or other information related to the matching other users. The uploading user may then choose to approach the one or more matched other users using this received information as a conversation starter or similar "icebreaker."

Figure 1:
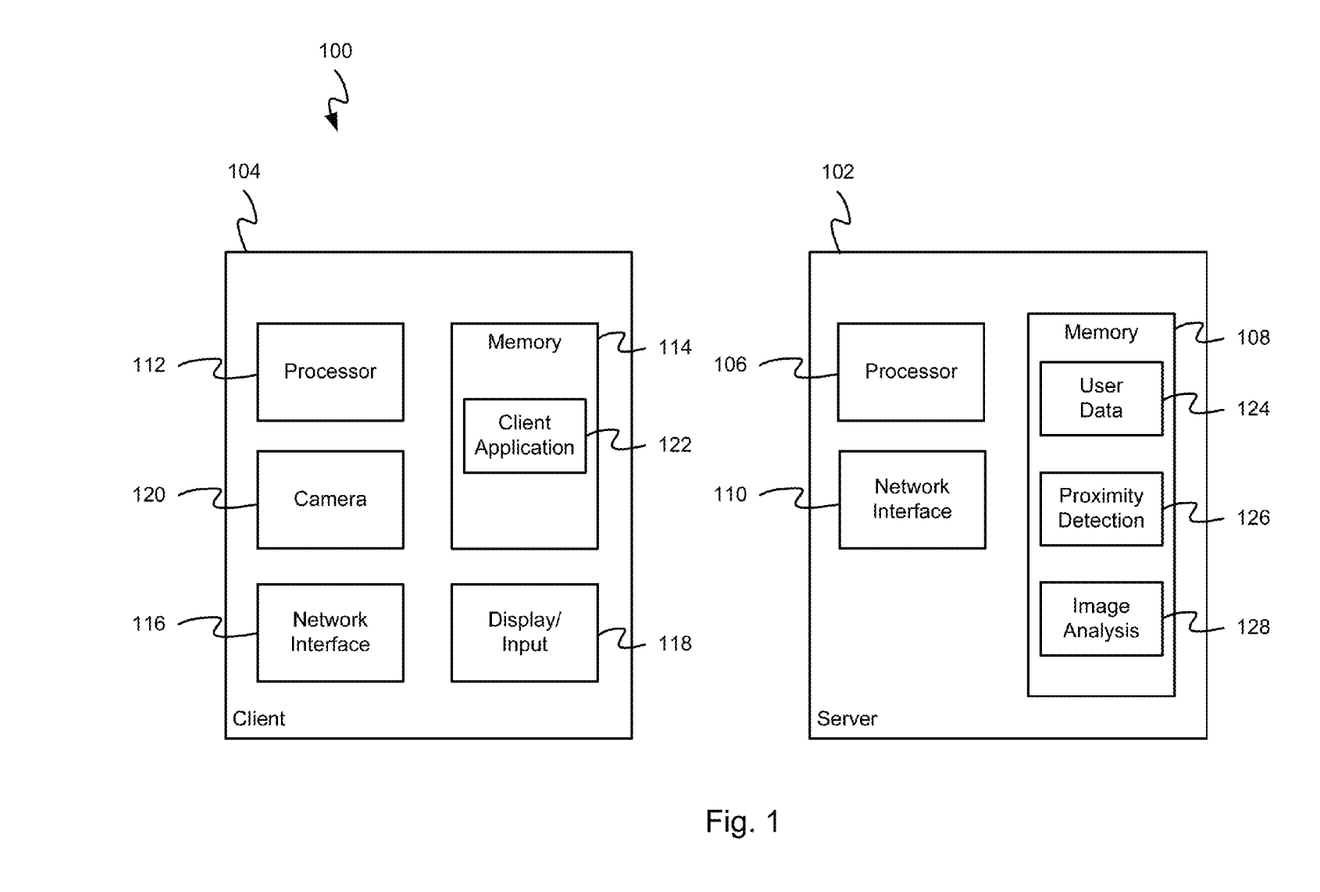
FIG. 1 is a block diagram of a client-server system for facilitating real-world interaction in accordance with an embodiment of the present invention.

FIG. 1 illustrates a system 100 that includes at least one server 102 and a plurality of clients 104. The server 102 may be any kind of computing system that includes a processor 106 (which may be, for example, one or more microprocessors or similar digital computation engines) and memory 108 (which may be volatile memory, such as RAM, and/or non-volatile memory, such as hard disk drives, flash drives, solid-state drives, and the like). In one embodiment, the memory 108 includes a database. The server 102 may further include a network interface 110 for communicating over the Internet, a cellular network, or other network via ETHERNET, Wi-Fi, or similar protocol. The server 102 is not limited to any particular device or configuration, however, and may include any other hardware or software known in the art; the server 102 may further consist of multiple server devices in the form of mirrored devices and/or devices broken up by functionality (such as, e.g., application servers and data servers).

The clients 104 may be any sort of end-user devices, such as smartphones, tablet PCs, personal digital assistants, handheld-game devices, laptops, desktop PCs, wearable devices, virtual-reality devices, GOOGLE GLASS devices, or any other systems. The clients 104 may include a processor 112, memory 114 (which may be volatile memory, such as RAM, and/or non-volatile memory, such as hard disk drives, flash drives, solid-state drives, and the like), and a network interface 116 (which may be a cellular, Wi-Fi, USB, or other network interface). An input/output interface 118 may include a touchscreen; in other embodiment, the interface 118 may include a non-touch screen (i.e., a traditional display device) and other input means (e.g., a keyboard, mouse, motion-capture device, voice input, or other similar devices). The client 104 may further include a camera or other image-capture device 120, which may be a digital CCD or similar device.

The server 102 and the clients 104 may communicate via any means known in the art (via the network interfaces 110 and 116), such as the Internet, wired links, wireless links (including Wi-Fi or similar protocols), cellular links (including WI-MAX, LTE, CDM, or similar protocols), near-field communication, or any other networking communication known in the art.

The users of the clients 104 may download and install a software application 122 to the memory 114 to facilitate communication with the server 102; in other embodiments, the clients 104 access a web page or similar server-side application via a web browser or thin client without the need to install the application 122. The application 122 may be available for download from an online marketplace, such as GOOGLE PLAY or APPLE ITUNES, or may be installed from a web site or other source. As described in greater detail below, the application may have further functionality than communication with the server 102.

In one embodiment, a user of a client 104 captures an image of his or her own face (or other distinguishing feature, such as body shape, hair style, height, facial hair, and/or any other distinguishing feature) and sends the image or images to the server 102 for storage in the memory 108 in a user-account database 124. In one embodiment, the user specifies an existing image associated with a social-media profile (or other such profile) rather than creating and uploading a new image; the user-account database 124 downloads this existing image in response. The server 102 associates the received image(s) with a user account associated with the user also stored in the memory 108. The user account may include additional information regarding the user, such as name, age, address, credit card or other payment information, and/or a biography of the user, including hobbies, interests, activities, or other such information.

I. Proximity Detection

Figure 2:
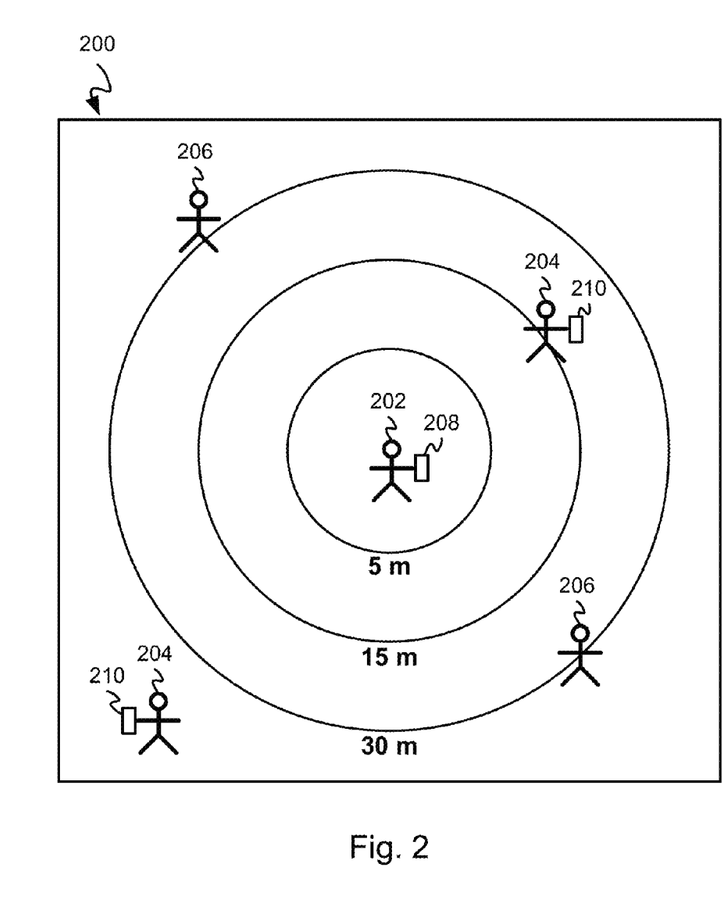
FIG. 2 is an illustration of a plurality of proximate users in accordance with an embodiment of the present invention.

The server 102 may detect when two or more clients 104 are within a certain physical proximity (e.g., 15 meters, 30 meters, or any other distance) using a proximity-detection module 126, which may include computer-program instructions stored in the memory 108 and may include programs written in C, C++, PERL, assembly language, or any other similar language. FIG. 2 illustrates an environment 200 that includes a first user 202, other users 204, and other, non-user persons 206. The first user has a client device 208; the other users 204 may have client devices 210 but, in other embodiments, need not be holding or otherwise have access to client devices 210. In the exemplary environment 200, no persons are present at a distance 5 m from the first user 202; one other user 204 is present at a distance 15 m from the first user 202; two non-users 206 are present at a distance of 30 m from the first user 202; and a second other user 204 is present outside a distance of 30 from the first user 202. Any number of users 204 and non-users 206 may be present, however, at any distance from the first user 202; the present invention is not limited to any particular number or distances.

In one embodiment, the clients 204, 206 include location-determination hardware and/or software, such as a GPS antenna and associated software and/or a program or utility to determine location based on available Wi-Fi networks. In some embodiments, other software and/or operating systems running on the client 204, 206, such as ANDROID by GOOGLE or IOS by APPLE, determine this location information and make it available to other programs or software via, for example, an API. In other embodiments, the users of the clients 204, 206 may manually input their location by inputting, for example, the name of a city, street, place of business, public venue, or other such location. The clients 204, 206 may automatically update their location to the server 102 at periodic intervals and/or upon detection of arrival at a new area or location; in other embodiments, the users of the clients 204, 206 manually request update of their location. In one embodiment, the client 208 displays the number of other users 204 in the environment 200 to the user 202 (using, e.g., a display on the client 208).

The number of users may be sorted by distance (e.g., one user 204 at 15 m and a second user 204 outside 30 m); in one embodiment, the first user 202 may request a maximum distance (e.g., 15 m) for reporting other users 204 (e.g., only one other user 204 present within 15 m). The number of users may be updated periodically and automatically or manually at the request of the first user 202.

II. Facial Recognition and Matching

Figure 3:
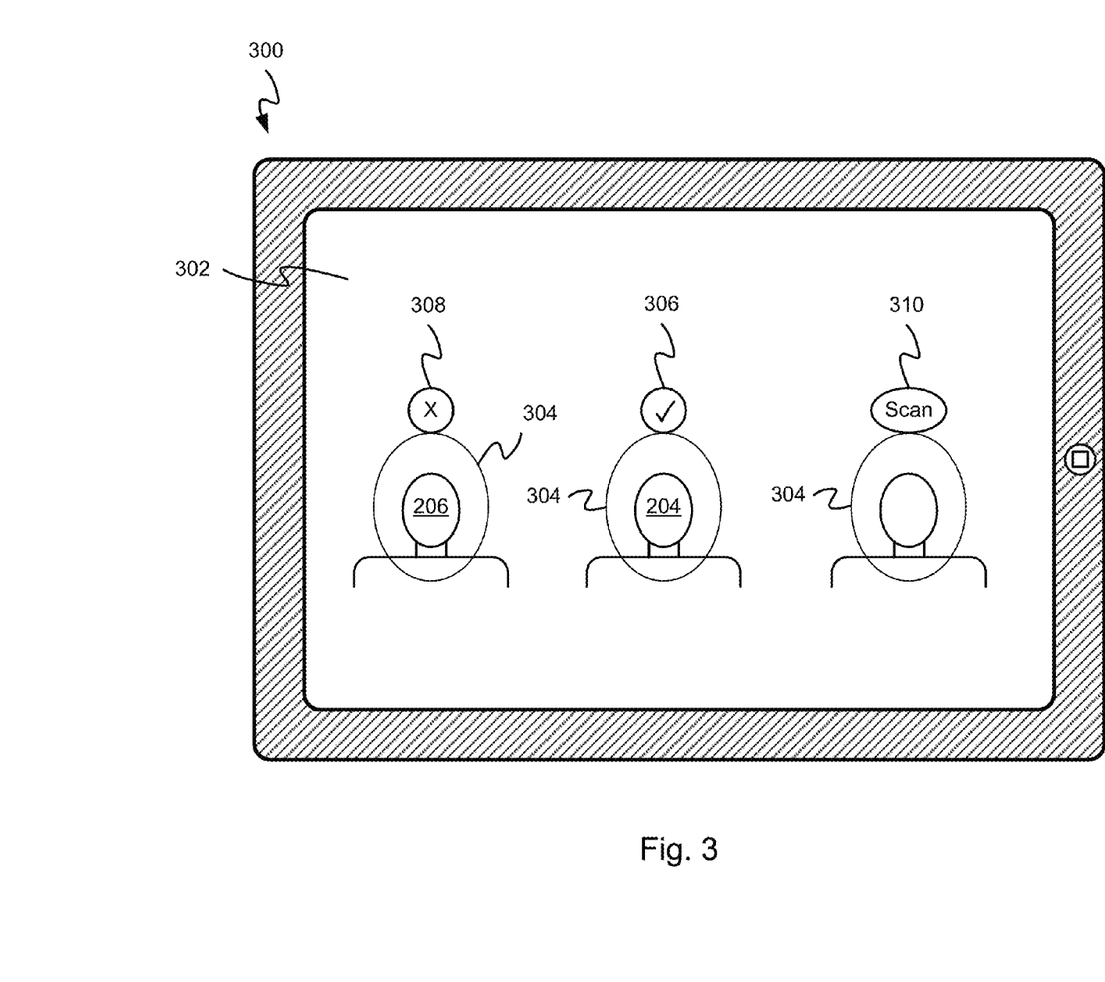
FIG. 3 is an illustration of a screen including captured image including users' faces in accordance with an embodiment of the present invention.
Figure 4:
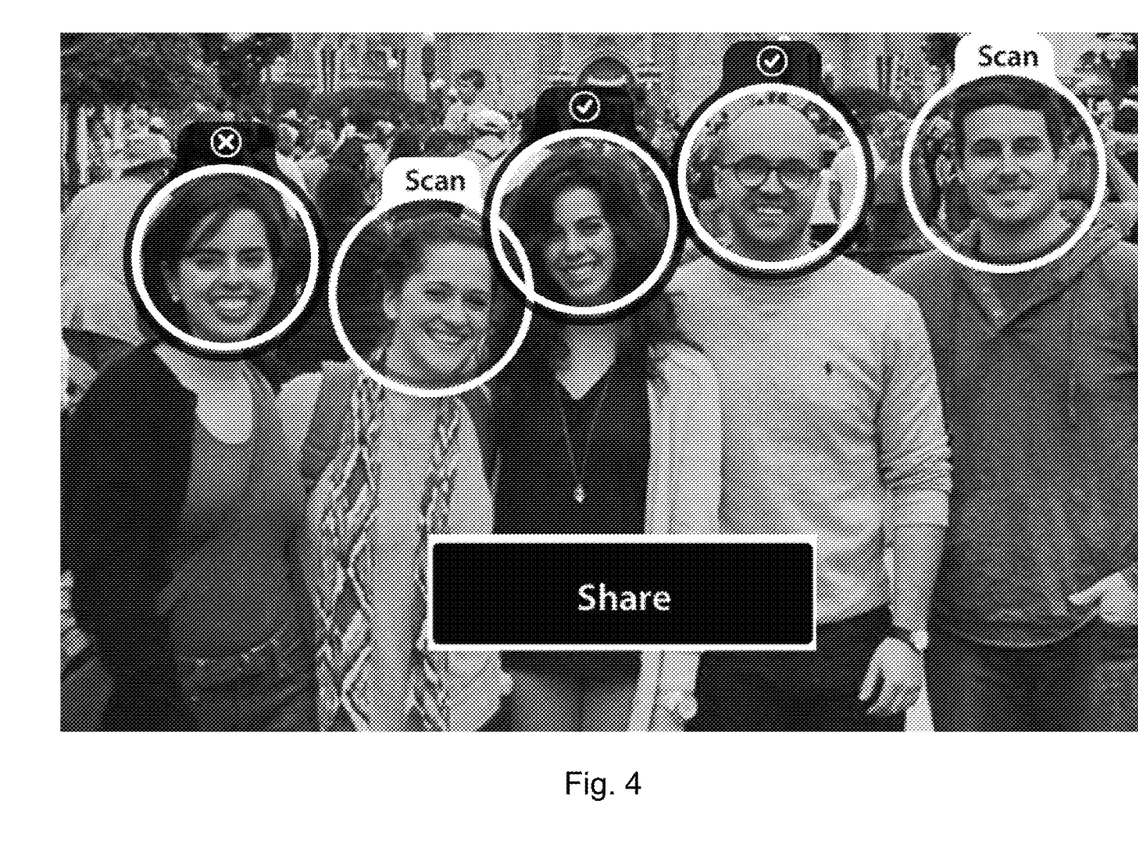
FIGS. 4 and 5 are screenshots of exemplary user interfaces in accordance with embodiments of the present invention.
Figure 5:
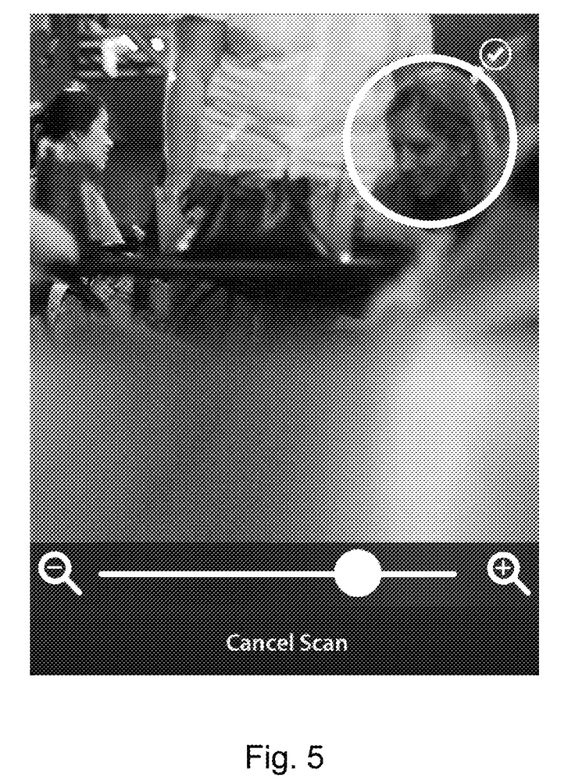

The user 202 of the client 208 captures an image, using a still camera, video camera, or any other type of image-capture device integrated with and/or in communication with the client 208, of a scene proximate the client 208 in the environment 200. FIG. 3 is an illustration of a display 300 of the client 208 that includes an exemplary captured image 302 as displayed on the client 208; FIGS. 4 and 5 illustrate screen shots of examples of the display. Images of other users 204 of one or more clients 210 may be present in the captured image; images of non-users 206 may also be present. In one embodiment, the captured image is analyzed (by the client 104 and/or server 102, and/or any other device) to detect faces or other distinguishing characteristics of persons therein. If one or more persons are identified and match a photograph previously uploaded to the server 102 by one or more users 204 of the clients 210, the client 208 so informs the user 202. Thus, in this embodiment, the system is "closed" in the sense that it compares captured faces only to faces previously uploaded or approved by registered users. In some embodiments, the face(s) in the captured image are instead or in addition compared to public images available on the Internet or other open network.

In one embodiment, the client 208 uploads the entire image 302 to the server 102 for facial-recognition processing thereon; an image-analysis module 128 in the memory 108 of the server 102 may analyze the image, using any technique known in the art, to detect faces therein and match the detected faces to a database of faces of known users. For example, the image-analysis module 128 may perform an edge-detect operation on the image 302 to determine the outlines of objects in the image and determine which outlines may correspond to the size/shape of faces; the image-analysis module 128 may further detect the presence of eyes, noses, or mouths within the candidate faces to further refine the possible detected faces. The image-analysis module 128 may further detect faces based on skin tone, disposition within the image 302, or any other factors. The image-analysis module 128 may further tilt, rotate, mirror, or otherwise modify detected faces to aid in detection and/or matching.

In other embodiments, some or all of this image processing may take place on the client 204. For example, the client 208 may attempt to detect faces in the image 302 locally, before or instead of uploading the image to the server 102. In these embodiments, the client 208 may not upload the entire image 302 to the server 102, but instead only the portions of the image 302 that contain candidate faces. In other embodiments, the client 208 performs image analysis to detect faces in the image 302 (and/or to compute metadata, including the attributes described above, based on the detected faces) and uploads only the detected faces and/or metadata to the server 102.

Once one or more faces are detected in the image 302 (by the server 102 and/or client 208), the detected faces are compared against previously uploaded faces associated with users 204 in the user database 124 by the image-analysis module 128. Any method or system for matching two faces to determine whether the faces match as known in the art is within the scope of the present invention. In one embodiment, attributes such as eye-to-eye separation, nose length, eye-to-nose-to-mouth distance, skin color, eye color, ear position, hair color, eyeglasses, hats, facial marks (such as acne, moles, or freckles), (or any other similar attribute) are computed for the faces in the two images and a match is declared if the attributes are equal or within an acceptable error tolerance. In one embodiment, a metric is computed to rate the accuracy of the match, and the match is communicated to the first user 202 only if the metric is above the threshold (e.g., 88%). In another embodiment, if the metrics of two or more candidate matches are computed to be too near each other (within, e.g., 8%), the matching is deemed inconclusive. The matching failure may be communicated to the first user 202 with a recommendation to, for example, acquire a clearer picture of the candidate matches.

The recognized faces may be compared against any number of previously uploaded faces in the user database 124. In one embodiment, all faces in the user database 124 are used. In other embodiments, the pool of faces for matching may be reduced in accordance with one or more factors. For example, only faces associated with user profiles and users detected proximate the first user 202 (as described above) may be searched for matching. In another embodiment, the size of the pool may instead or in addition be reduced in accordance with features detected in the captured face. For example, if the captured face is determined to have a certain hair color, eye color, etc., only user profiles matching the determined attributes are searched. In another embodiment, the determined attributes are analyzed to determine further information regarding the captured face, such as sex, mood, height, etc.; only user profiles matching these derived attributes are searched. In still another embodiment, only faces associated with user accounts having some sort of prior connection to the user 202 are searched (and/or are searched before other faces are searched). For example, the user 202 may have previously matched, corresponded with, and/or forged a social-media link with one or more second users 204; faces associated with these prior connections are searched first or exclusively.

In one embodiment, once the server 102 detects the presence of other users 204 in the environment 200 near the first user 202, facial data (and/or other data) associated with the accounts of the other users 204 is transmitted to the client 208. The facial data may include image data and/or metadata related to the facial data; in one embodiment, the metadata includes the attributes (e.g., eye-to-eye separation, etc.) discussed above. The data may be cached on the client 208 for faster access but encrypted or otherwise unavailable for inspection by the user 202 until a face is recognized. The server 102 may detect that a certain second user 204 is being detected by other users more frequently than other second users 204; data pertaining to this more-frequently-recognized second user 204 may be cached on the server 102 and/or clients 208 for faster access thereafter. In this embodiment, the client device 208 detects faces in the image 302 and matches the detected faces against the facial data/metadata downloaded from the server 102 and, if a match is detected, informs the user 202.

Various embodiments of facial recognition were described above as being performed on the client 208 and/or server 102 (e.g., fully performed on the client using facial data and/or facial metadata; the client does some image processing and uploads facial data and/or facial metadata for matching on the server; and fully performed on the server). In one embodiment, the software application 114 on the client 208 and/or the server 102 analyzes the processing power of the processor 112 on the client and/or the speed of the network link between the server 102 and the client 208 and selects one of these embodiments automatically based thereon (and/or selects a different embodiment if, for example, the speed of the network link increases or decreases). If the processing power of the processor 112 is low and/or the speed of the network link is high, the server 102 may be selected to perform the facial recognition and/or matching. If, on the other hand, the processing power of the processor 112 is high and/or the speed of the network link is low, the client 208 may be selected to perform facial recognition and/or matching.

Once the image 302 has been analyzed (by the client 208 and/or server 102), the results of the analysis may be displayed on the screen 300. In one embodiment, a circle 304 (or other visual indication, such as an oval, rectangle, highlight color, etc.) is displayed around the face of each detected user 204 or non-user 206. If a detected face belongs to a user 204, a positive match indication is displayed (such as a check mark 306); if a detected face belongs to a non-user, or if a low quality of facial detection prohibits an attempted match, a negative match indication is displayed (such as an X-mark 308). If a face cannot be determined to belong to a user 204 or a non-user 206, an input element may be displayed requesting additional scanning of the face (such as a scan button 310).

In one embodiment, the user 202 may manually indicate, on the display 300, the positions of any faces within the image 302. For example, the user 202 may touch the area of the faces to place the circles 304 and/or may use a multi-touch gesture to both size and place the circles 304. The client 208 and/or server 102 may first make a first-pass attempt to detect faces in the image 302 and display circles 304 for detected faces; the user 202 may then manually place circles 304 around any un-detected faces.

Facial recognition and/or face-matching with faces in the user database 124 may occur automatically after capture of the image 302, as described above; in another embodiment, these procedures occur only after further input from the user 202. For example, upon capture of the image 302, the client 208 and/or server 102 may wait for the user to select one or more areas of the image 302 containing faces (by, for example, touching, swiping, or clicking on the area(s)) before proceeding to detect faces within the indicated areas. Similarly, the client 208 and/or server 102 may automatically detect faces in the image 302 (and draw the indicating circles 304 on the screen 300) but wait for further input from the user, such as touching, swiping, or clicking a detected face, before matching the detected face against facial data in the user database 124.

If no faces are detected in the image 302 and/or if faces are detected but the quality of the image 302 is too low to permit matching, the client 208 may indicate this failure to the user 202 and request the enabling of a device flash, the capturing of a higher-pixel image, the enabling of anti-shake technology, or other similar feature or method for improving the quality of a photograph. In one embodiment, the client 208 detects that an ambient light level is too low (via the use of, for example, a light sensor or camera lens) for an accurate picture and so informs the user 202. Once the adjustment is made, the client 208 may request that the user 202 re-take the photograph.

In one embodiment, the client 208 and/or server 102 analyzes the image 302 and the faces therein to determine a distance between the detected face(s) and the user 202. This distance may be determined by, for example, an absolute size of a detected face, a relative size of a detected face (as compared to the size of another object of known size, such as another face, a floor-to-ceiling height, a door frame, a chair, or other such object appearing in the image 302), and/or via the use of perspective elements in the image 302 (such as, for example, a repeating tile pattern on a floor, a wall/ceiling joint, or other such objects or elements in the image 302 that provide an indication of perspective). In one embodiment, the user 202 may choose to detect and match only faces belonging to persons within a certain distance from the user 202. In another embodiment, the client 208 may permit facial detection and matching outside of a certain distance from the user 202 only upon subscription/payment of a pay service. A user-interface element, such as a zoom bar or pinch-to-zoom function, may be displayed on the display 300 to aid the user 202 in selecting distant other users 204.

In the above embodiments, a still image was analyzed to determine the presence of faces therein (and of the matching of detected faces to user database 124). In other embodiments, the client 208 captures a stream of video frames and facial recognition and user matching is performed thereon. The circles 304 and/or match indicators 306, 308 may thus be displayed on the display 300 in real-time or in near-real-time (taking into account, for example, network lag between the client 208 and the server 102). In one embodiment, facial recognition and matching is performed on the client 208 (after the server 102 sends the appropriate facial data to the client 208) to eliminate network lag to the server 102. As is known in the art, a single video frame may be analyzed and/or successive video frames may be analyzed in the aggregate; information missing in one frame may be found in a temporally nearby frame. The user 202 may thus, in one embodiment, activate the video input mode or device on the client 208 and, for example, rotate, pan the client 208 around the environment 200 and/or move within the environment 200 to capture the faces of various persons within the environment not visible or available from a single viewpoint or position.

III. Social Connection

Once at least one other user 204 has been identified (as indicated by, for example, the check mark 306), the client 208 may present further opportunities (beyond simply indicating a match of the other user 204) with which the user 202 may interact with the user 204. In one embodiment, the user 202 may call up information relating to the other user 204 (by, for example, touching or clicking on the check mark 306). This information may include the other user's 204 first name, last name, alias, nickname, age, tagline, status, common friends on social-media accounts such as FACEBOOK or TWITTER, interests, field of study or work, business card, or other information. The sending of a business card (or similar electronic-contact information) may be accompanied by a request to create a social-media link (i.e., a "friend request"), and viewing of the received contact information may be dependent upon acceptance of the link. The amount and type of information delivered to the first user 202 may be set or controlled by the second user 204, either ahead of time or at the time of matching, by the second user 204 accessing his or her user account information in the database 124. For example, the second user 204 may limit information delivered to the first user 202 if the first user 202 is a certain sex or above or below a certain age. The second user 204 may further limit information based on the type of environment 200; the second user 204 may choose to share more information if the environment is a trusted one, such as a workplace or private party and less information if the environment is an open one, such as a bar, club, or other public social gathering.

The client 208 may further allow the first user 202 to send a text, picture, gift, coupon, payment, file, or voice message to the second user via the client applications 114 running on each of the users' clients. The payment or coupon may be, for example, for a drink or food item at a bar or restaurant, and it may include a QR or similar barcode to authorize payment. In other embodiments, the first user 202 may send a pre-paid drink or product (accompanied by a confirmation code to complete the purchase on the first user's 202 client 208, to thereby help facilitate an in-person interaction between the first user 202 and the second user 204), a game that the first 202 and second 204 users may play together from afar, purchasable emoticons and other animated messages, a digital event invite (e.g., a screen in a file-sharing service such as DROPBOX), a poke or other button (e.g., an "I like you" button). The payment may be made from a distance, or a request for payment may be made by sending a digital bill or invoice with a message. In one embodiment, a payment or payment request may be sent to a group of people (by, for example, selecting members of the group by selecting faces on the screen 300; the group payment or payment request may be made to, for example, split a food bill or bar tab. In one embodiment, the payee is a bartender, hostess, or doorman, and submitting a payment thereto allows the first user 202 to advance to the front of a line or waiting list. Any sort of peer-to-peer communications are within the scope of the present invention; in one embodiment, the client application 114 presents an SMS-text-like interface for communication.

Delivery of the communication may proceed only of the second user 204 has specified that communications are allowed from those of the first user's 202 age, gender, location, or other factor. If communication is not permitted, the client 208 may display a corresponding message on the display 300 of the client 208 so informing the first user 202. If the second user 204 receives an unwanted message, the second user 204 may choose to ignore it, block further messages, and/or report it to the server 102 as abuse. In one embodiment, if the first user 202 sends too many messages (e.g., three or more) without a response back from the second user 204, further communications are automatically blocked.

In one embodiment, the first user 202 may request an introduction or recommendation to a second user 204 from a third party trusted by or known by both the first 202 and second user 204. The third party may be another user present in the environment to whom the first 202 and second 204 users have previously met via the facial-recognition and matching method and system described herein. In other embodiments, social-media links exist between both the first 202 and second 204 users and the third party (i.e., the third party is a mutual social-media "friend"). The screen 300 may display common social-media friends to the first user 202 upon request (e.g., by tapping the face of the second user 204 on the screen 300).

In one embodiment, after facial recognition and matching occurs, the server 102 checks to see if the first user 202 has previously uploaded a face picture (and/or other requisite information) to the user database 124. If not, the server 102 (via the client 208) may prompt the first user 202 that the uploading of this information is required before the first user may communicate with, or access any information regarding, the second user 204.

If a plurality of second users 204 are detected and matched, the client 208 may permit the first user 202 to browse through the matching users 204 via a sliding or scrolling interface (or similar feature). The matching users 204 may be displayed by order of distance from the first user 202, by gender, by age, or randomly. In one embodiment, one or more second users 204 may pay a fee to have their match status displayed at the top of the list. The server 102 may analyze which second users 204 the first user 202 more frequently captures, matches, requests information for, and/or initiates communication with; attributes common to these more-frequent matches may be extracted (such as a common sex, age, or height) and future matches that correspond to these common attributes may be displayed at or near the top of the list.

Additional features may be provided by the present method and system and/or be provided by third-party applications in communication with the present method and system. These features may include, for example, the providing of a popularity rating for a matched user, an estimated age of the matched user, or other features. In one embodiment, the present system and method and/or third-party applications display advertisements on the display 300 targeted using captured image data, extracted facial attributes, text or pictures used in communication between users, or any other such data.

In the embodiments described above, the information relating to and/or the possibility of communication with second users 204 is presented to the first user 202 only after capture of one or more images and the matching of faces therein. In one embodiment, the server 102 detects the proximity of the second users 204 via the means described above (e.g., GPS, Wi-Fi, or manual check-in) and displays a list of these proximate second users 204 to the first user 202 without requiring the first user 202 to first capture an image. That is, the first user 202 is provided a list of nearby second users 204 (with, in one embodiment, accompanying photos and/or other information) simply by virtue of being nearby the second users 204. The server 102 may permit this function only upon payment of a fee by the first user 202; the second users 204 may request, by accessing their user account data 124, to opt-out of this feature.

In one embodiment, the user 202 is a celebrity or other popular figure and receives a high number of communication requests from other users 204 (i.e., a factor of greater than 10 or 100 times the number of requests sent by the user 202). In this embodiment, potentially for a fee, the user 202 configures their user account data 124 to send automatic replies to communications or communications requests. The replies may include a standard message, such as a promotional message, a coupon or other gift, a link to a downloadable file (such as a video or song), a product advertisement or website, and/or a digital-autograph card.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for facilitating real-world interaction, the method comprising:
    receiving, at a server, information regarding geographical positions of a plurality of client devices;
    determining, at the server, that a subset of the plurality of client devices are within a given distance of each other;
    matching a plurality of faces detected in an image captured by one of the plurality of client devices to facial data stored in a user database; and
    providing, to the one of the plurality of client devices, information regarding a plurality of users associated with the facial data, wherein the one of the plurality of client devices presents the information regarding a plurality of users in an order that presents preferred users first.

2. The method of claim 1, wherein the step of matching is performed on the server or on the one of the plurality of client devices.

3. The method of claim 1, wherein the information comprises a first name, last name, alias, hobby, interest, contact information, or business card associated with the user.

4. The method of claim 1, further comprising sending, from the one of the plurality of client devices to the user, a request for a payment, a payment, a chat request, text, a photo, or a request to initiate a game.

5. The method of claim 1, wherein the facial data is narrowed in accordance with a proximity of the user to the one of the plurality of client devices, a physical attribute of the user, a derived attribute of the user, or a social-media connection of the user.

6. The method of claim 1, wherein the information regarding a plurality of users associated with the plurality of faces is further presented to the one of the plurality of client devices in a random order, in an order sorted by distance to the one of the plurality of client devices, or in an order sorted by sex or age of the users.

7. The method of claim 1, wherein the image is a still image or one of a plurality of video frames.

8. The method of claim 1, further comprising displaying an advertisement on the one of the plurality of client devices targeted based on information in the user database relating to the user.

9. A system for facilitating real-world interaction, the system comprising:
    a database for storing a plurality of user profiles, wherein each user profile comprises facial data associated with a user; and
    a processor for executing instructions comprising:
        i. receiving information regarding geographical positions of a plurality of client devices;
        ii. determining that a subset of the plurality of client devices are within a given distance of each other;
        iii. matching a plurality of faces detected in an image captured by one of the plurality of client devices to facial data stored in the database; and
        iv. providing, to the one of the plurality of client devices, information regarding a plurality of users associated with the facial data, wherein the one of the plurality of client devices presents the information regarding a plurality of users in a random order.

10. The system of claim 9, wherein the client devices comprise smartphones, tablet PCs, or laptop computers.

11. The system of claim 9, wherein the information regarding geographical positions of the client devices is derived from a GPS receiver, Wi-Fi antenna, or user input on the client devices.

12. The system of claim 9, wherein the image is captured using a still camera or video camera associated with the one of the plurality of client devices.

13. The system of claim 9, wherein the matching is performed on a server or on the one of the plurality of client devices.

14. The system of claim 9, wherein the information comprises a first name, last name, alias, hobby, interest, contact information, or business card associated with the user.

15. The system of claim 9, further comprising sending, from the one of the plurality of client devices to the user, a request for a payment, a payment, a chat request, text, a photo, or a request to initiate a game.

16. The system of claim 9, wherein the facial data is narrowed in accordance with a proximity of the user to the one of the plurality of client devices, a physical attribute of the user, a derived attribute of the user, or a social-media connection of the user.

* * * * *